(12) United States Patent
Grau et al.

(10) Patent No.: US 6,845,174 B2
(45) Date of Patent: Jan. 18, 2005

(54) ARRANGEMENT AND METHOD FOR THE IDENTIFICATION OF SUBSTRATES

(75) Inventors: Dominik Grau, Nauendorf (DE); Andreas Birkner, Jena (DE); Knut Hiltawski, Saalfeld (DE); Frank Bernhardt, Kahla (DE)

(73) Assignee: Leica Microsystems Jena GmbH, Jena (DE)

( * ) Notice: Subject to any disclaimer, the term of this patent is extended or adjusted under 35 U.S.C. 154(b) by 566 days.

(21) Appl. No.: 10/050,114

(22) Filed: Jan. 18, 2002

(65) Prior Publication Data

US 2002/0097905 A1 Jul. 25, 2002

(30) Foreign Application Priority Data

Jan. 19, 2001 (DE) .......................................... 101 02 540

(51) Int. Cl.⁷ ................................................ G06K 9/00
(52) U.S. Cl. ........................ 382/151; 382/149; 382/147
(58) Field of Search .......................... 382/141, 143–152; 356/237.1, 237.4, 237.5; 348/87, 126; 438/16

(56) References Cited

U.S. PATENT DOCUMENTS

| | | | |
|---|---|---|---|
| 4,007,988 A | * | 2/1977 | Bromfield et al. .......... 355/133 |
| 4,723,221 A | * | 2/1988 | Matsuura et al. ........... 356/401 |
| 5,238,354 A | | 8/1993 | Volovich ..................... 414/779 |
| 5,870,488 A | | 2/1999 | Rush et al. ................. 382/151 |
| 2001/0014170 A1 | * | 8/2001 | Willems van Dijk et al. ... 382/151 |

* cited by examiner

*Primary Examiner*—Vikkram Bali
(74) *Attorney, Agent, or Firm*—Foley & Lardner LLP

(57) ABSTRACT

An arrangement for the identification of a substrate (S) having at least one identification marking (I), comprising
a turntable (2) for rotating a substrate (S) placed thereon;
an illumination source (4) and a receiving device (5) for evaluating the intensity of the light emerging from the illumination source (4), the edge zone of the substrate (S) placed on the turntable (2), upon rotation thereof, influencing the light intensity striking the receiving device (5);
a device (6) for reading the identification marking (I), having a sensing region (E); and
a calculation device that calculates a manipulated variable for a correction rotation angle about the rotation axis (A) for alignment of the identification marking (I) with respect to the sensing region (E), and a manipulated variable for a correction motion for changing the position of the sensing region (E) with respect to the rotation axis (A) or with respect to the actual position of the identification marking (I), and outputs them to a positioning device.

A corresponding identification method is also described.

13 Claims, 3 Drawing Sheets

ARRANGEMENT AND METHOD FOR THE IDENTIFICATION OF SUBSTRATES

CROSS REFERENCE TO RELATED APPLICATIONS

This invention claims priority of the German patent application 101 02 540.8 which is incorporated by reference herein.

FIELD OF THE INVENTION

The invention concerns an arrangement for the identification of a substrate, in particular a semiconductor wafer, having at least one identification marking that is located in a predefined position with respect to a position mark on the edge zone of the substrate. The invention furthermore concerns a corresponding method.

BACKGROUND OF THE INVENTION

In many applications it is necessary to identify a substrate, for example a semiconductor wafer, with the aid of a marking located on the substrate. Said marking is preferably read out in an automated process. It is theoretically possible to scan the entire area of the substrate and read out the information that is acquired. For that purpose, the acquired information must be processed using suitable image processing methods in order first to locate the marking and then to detect its content.

As a rule, however, the identification markings are very small compared to the size of the substrate. With the procedure explained above, a large volume of useless information would be obtained. The result would be a great deal of calculation effort, so that a comparatively large amount of time would be needed in order to identify a substrate.

Hitherto, for this reason, the substrate is first subjected, prior to reading the identification marking (whose position on the substrate is known per se), to what is referred to in the literature as "prealigning." U.S. Pat. No. 5,870,488, for example, describes prealigning methods in which a substrate to be identified is first placed in a noncentered position on a turntable. By means of a subsequent rotation of the substrate, its eccentricity with respect to the turntable is determined; and then a positional correction of the substrate is performed by a displacement of the substrate, so that the substrate is subsequently centered on the turntable.

As set forth in U.S. Pat. No. 5,870,488, this procedure, which is known e.g. from U.S. Pat. No. 5,238,354, is very complex because of the two-stage alignment process required therein.

As an alternative thereto, it is proposed in U.S. Pat. No. 5,870,488 to sense the actual position of the substrate while it is being conveyed to the turntable, and to perform a correction immediately upon subsequent placement onto the turntable. The result of this is that the substrate is always placed concentrically with the turntable. The angular position of the substrate can be sensed by means of a rotation of the turntable, so that all the information needed to place the identification marking in the sensing region of an optical character recognition (OCR) camera can then be derived therefrom. Here again, very accurate positioning of the substrate on the turntable is therefore necessary before the actual identification operation. The identification method proposed in U.S. Pat. No. 5,870,488 thus requires a first measurement operation with a subsequent calculation step, followed by a very accurate placement of the substrate on the turntable, another measurement operation with a subsequent calculation step, and lastly a movement to the marking, which is then read out in known fashion.

SUMMARY OF THE INVENTION

Proceeding from this existing art, it is the object of the invention to simplify the reading out of an identification marking on a substrate of the kind described initially.

This object is achieved by means of an arrangement for the identification of a substrate, in particular a semiconductor wafer, having at least one identification marking that is located in a predefined position with respect to a position mark on the edge zone of the substrate, comprising:

a turntable for rotating a substrate placed thereon about a rotation axis;

an illumination source and a receiving device for evaluating the intensity of the light emerging from the illumination source, the illumination source and receiving device being arranged in such a way that the edge zone of the substrate, upon rotation, influences the light intensity striking the receiving device;

a device for reading the identification marking, having a sensing region that senses only a subregion of the substrate placed on the turntable, the position of the sensing region relative to the rotation axis being modifiable; and a calculation device that calculates, from the intensity changes ascertained during the rotation, a manipulated variable for a correction rotation angle about the rotation axis for alignment of the identification marking with respect to the sensing region, and a manipulated variable for a correction motion for changing the position of the sensing region with respect to the rotation axis or with respect to the actual position of the identification marking, and outputs them to a positioning device.

The arrangement according to the present invention eliminates the need to align the substrate with respect to the rotation axis after placement on the turntable. The result is an overall reduction in the risk, implicit in every movement of the substrate, of damage during handling of the substrate.

Above all, however, the arrangement according to the present invention makes it possible to locate and read out, at high speed, the identification marking of a substrate that is not placed concentrically on the turntable, with no need to modify the position of the substrate relative to the turntable for that purpose.

Because the identification marking is located and read out in targeted fashion, the sensing region of the reading device can moreover be made very small, so that the time needed to evaluate the information read out in the sensing region is very short.

Together with elimination of the operation to position the substrate relative to the turntable, what is obtained overall is a very high speed for a complete operation of reading out an identification marking. It is additionally worth mentioning in this context that the adjustment of the correction angle and the displacement of the sensing region can be performed simultaneously. High throughput speeds can be achieved with the identification arrangement according to the present invention, which preferably is used in conjunction with apparatuses and inspection devices utilized in the manufacture of semiconductor wafers.

With the arrangement according to the present invention it is also possible to process substrates of different diameters. This is merely a question of dimensioning the displacement region between the sensing region and the rotation axis.

The relative motion between the sensing region and the rotation axis is preferably implemented by way of the movability of the sensing region.

In an advantageous embodiment of the invention, the reading device is arranged on a carriage that can be moved toward and away from the rotation axis. The motion of the carriage preferably is accomplished as a function of the correction travel needed for the sensing region of the reading device.

The latter is adapted to the identification markings used. These usually comprise letters, numbers, and similar characters, so that it is advantageous if the reading device comprises an OCR device with which the characters in the marking can be recognized. Binary codes that are occasionally used can also be read out and identified therewith.

In a further advantageous embodiment of the invention, the illumination source and the receiving device are arranged opposite one another is such a way that upon a rotation of the turntable, the edge zone of a substrate placed on the turntable projects into the beam of the illumination source directed onto the receiving device. This makes it particularly easy to sense the position marks, in the form of a small notch or an edge segment cut off in rectilinear fashion, commonly used for the labeling of semiconductor wafers, since said marks are clearly perceptible by means of a change in the measured intensity profile over the positioning angle of the rotation axis.

The receiving device is preferably configured to have an extension in the radial direction, with respect to the rotation axis, such that the positional deviations of the substrate with respect to the rotation axis of the edge of the respective substrate which usually occur during a rotation result in an influence on the light that is received.

Especially when substrates of differing sizes or diameters are to be identified, it is advantageous to configure the receiving device to be movable toward and away from the rotation axis, so that despite the use of a comparatively small receiving device, the fluctuations in the distance of the edge of a substrate from the rotation axis that result from the positional deviation can always be sensed.

In a further embodiment, the receiving device and the illumination device are provided on the carriage of the reading device. The dual function of the carriage—namely on the one hand to make possible a displacement of the sensing region of the reading device, and on the other hand to align the illumination device and receiving device onto the edge of a substrate to be identified—make it possible to minimize the complexity of the arrangement in terms of design and equipment, while retaining great flexibility thereof in terms of different substrate sizes.

In a further advantageous embodiment of the invention, the reading device is configured to read multiple identification markings applied onto sides of the substrate opposite one another. The arrangement is thus independent of the side on which the identification marking is applied on a substrate. In particular when the arrangement is used in conjunction with further apparatuses for handling the substrates, it is thus possible to avoid turning the substrates over, which would be associated with additional outlay in terms of equipment as well as an associated risk of damage to the substrates.

The aforementioned object is furthermore achieved by means of a method for the identification of a substrate, in particular a semiconductor wafer, having at least one identification marking that is located in a predefined position with respect to a position mark on the edge zone of the substrate, in which the substrate is rotated about a rotation axis;

a change in light intensity influenced, during the rotation of the substrate, by its edge zone is evaluated in correlation with the position of the position mark;

from the profile of the change in intensity, the actual position of the identification marking is determined, and from it a manipulated variable for a correction rotation angle about the rotation axis for alignment of the identification marking with respect to the sensing region, and a manipulated variable for a correction motion for changing the position of the sensing region with respect to the rotation axis or with respect to the actual position of the identification marking, are calculated;

on the basis of said manipulated variables, the alignment of the sensing region relative to the actual position of the identification marking is performed; and the information of the identification marking is read out and further processed.

The method according to the present invention allows an identification marking on a substrate to be read out quickly and easily. Said method is preferably used with the arrangement according to the present invention or with one of its further embodiments.

An OCR-readable code is preferably read out in this context. The algorithms required for that purpose are generally known and therefore require no further explanation for those skilled in the art.

The correction motion for the sensing region relative to the rotation axis is preferably accomplished by means of a motion exclusively of the sensing region. For a particularly simple compensation for the positional deviation, a translational motion that preferably is performed in a single longitudinal direction is executed.

BRIEF DESCRIPTION OF THE DRAWINGS

The invention will be explained in more detail below with reference to exemplary embodiments. In the accompanying drawings.

DETAILED DESCRIPTION OF THE INVENTION

Figure 1:
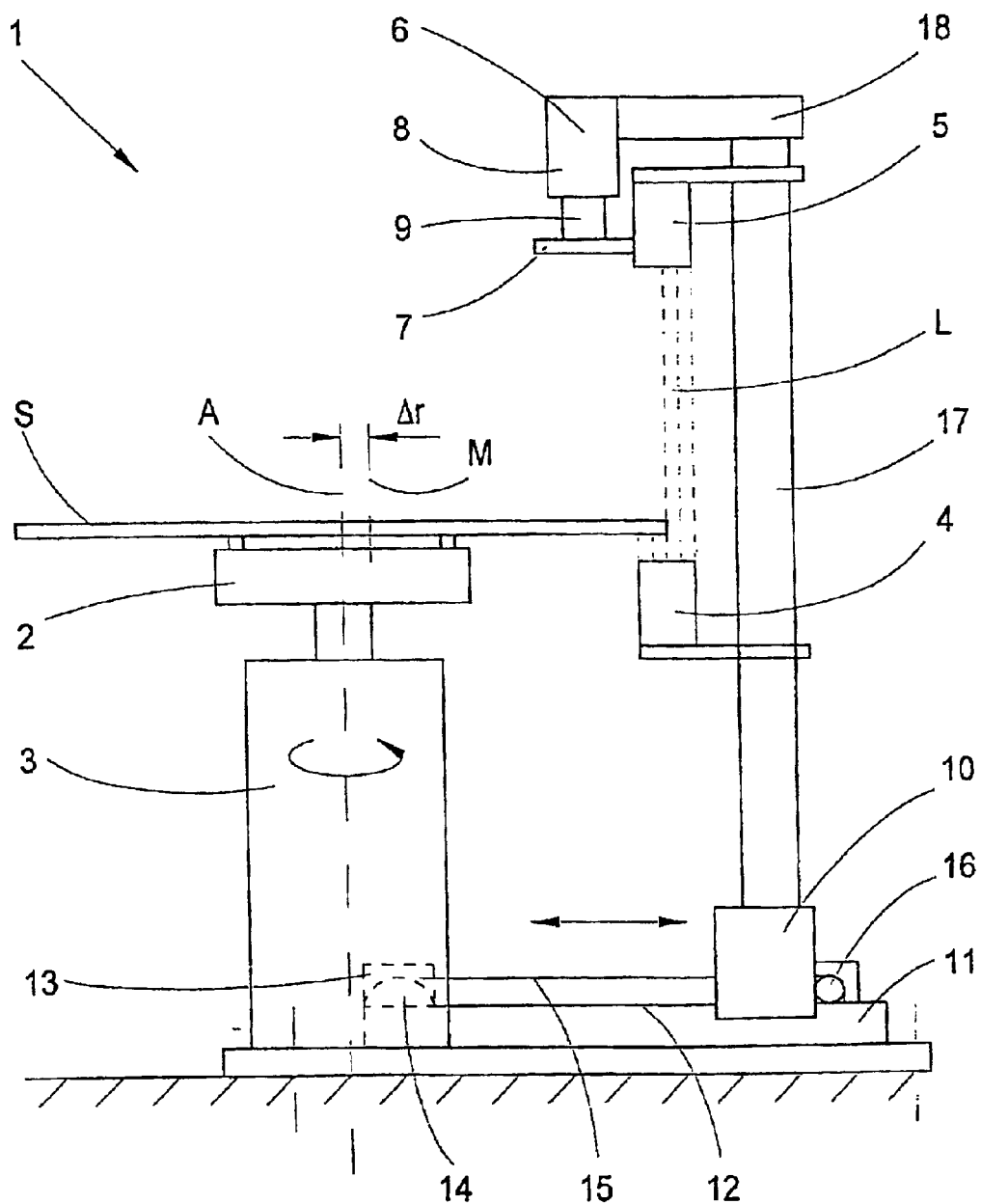
FIG. 1 is a schematic side view of a first exemplary embodiment of an arrangement for the identification of a substrate.
Figure 2:
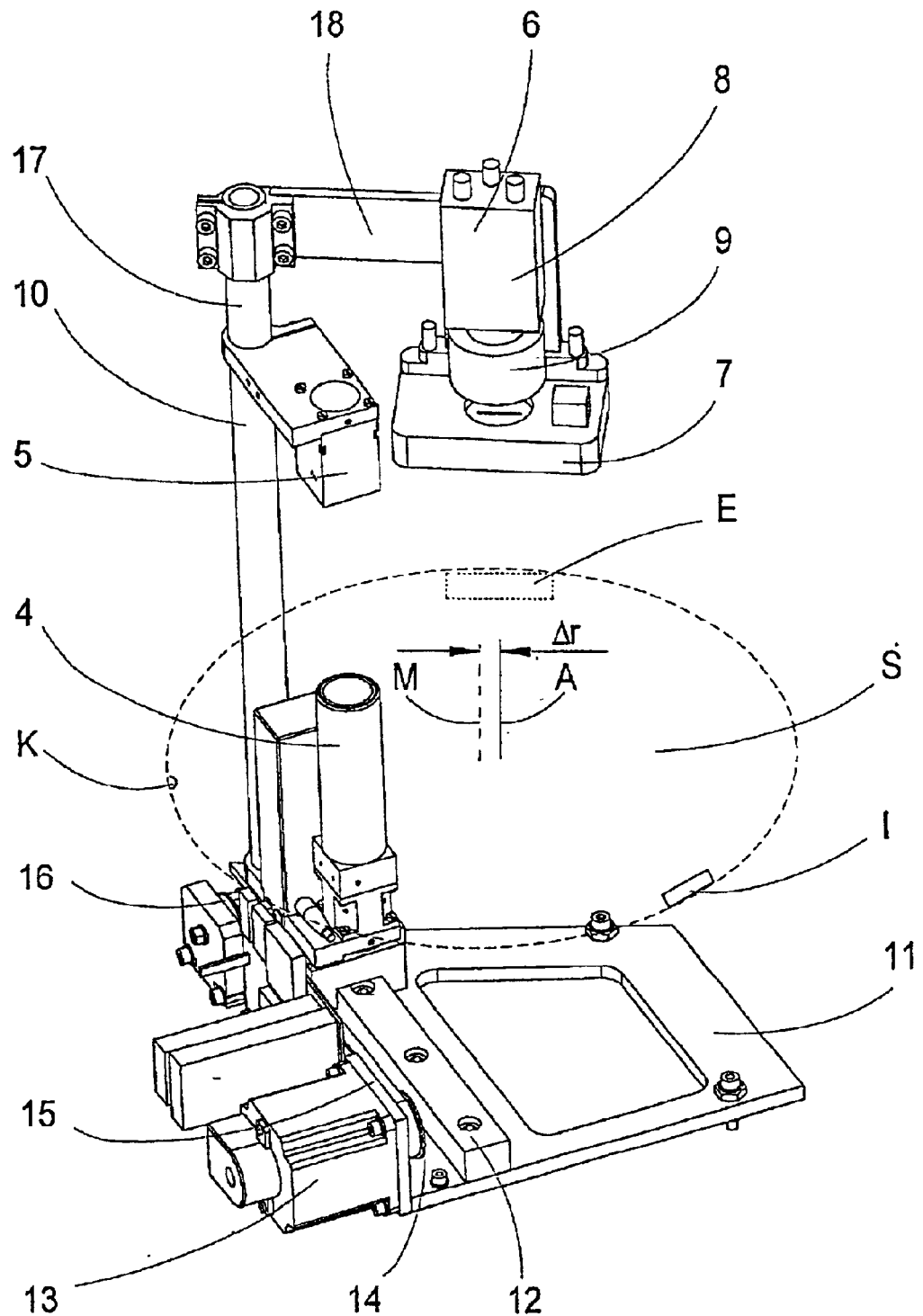
FIG. 2 is a perspective view of the arrangement of FIG. 1, a turntable for holding the substrate and its drive device not being depicted.

The first exemplary embodiment in FIG. 1 and FIG. 2 shows an arrangement 1 for the identification of a planar substrate S that possesses a basic circular shape. Configured on the outer periphery of substrate S is a notch K that serves as a position mark. The position of notch K on substrate S is accurately known, so that substrate S and structures located on it can be aligned by means of notch K with respect to any desired coordinate system. Instead of notch K, it is also possible to provide as the position mark other shapes that define a reference point by way of a geometrically characteristic edge shape on substrate S. For example, an edge segment flattened in rectilinear fashion or a defined noncircularity can also be provided instead of notch K.

In the exemplary embodiment depicted, substrate S is a semiconductor wafer having a diameter on the order of 300 mm. The identification arrangement is also suitable, however, for handling wafers with smaller or larger diameters. Substrate S furthermore has an identification marking I that represents an individual label of substrate S. Said identification marking I is arranged in a region of substrate S close to the edge, and requires only a small portion of the area of substrate S. Identification marking I usually comprises a combination of letters and numbers, as well as optionally further characters.

Said identification marking now needs to be efficiently located and read using identification arrangement 1.

For that purpose, identification arrangement 1 comprises a turntable 2 that is rotatable by a drive device 3 about a rotation axis A. Substrate S that is to be identified is placed on turntable 2; exactly concentric alignment of substrate S with respect to rotation axis A is not important. On the contrary, a positional deviation Δr between rotation axis A and a center axis M of substrate S can be tolerated. The tolerance range encompasses the positional deviations between center axis M and rotation axis A that usually occur when substrate S is placed in roughly targeted fashion on turntable 2. A specific position of notch K during placement is also not important.

Identification arrangement 1 furthermore comprises an illumination source 4 as well as a receiving device 5 for measuring light intensity. Receiving device 5 is arranged in such a way that upon a rotation of turntable 2 about rotation axis A, the edge of substrate S placed on turntable 2 influences the light sensed by receiving device 5. If substrate S is not placed on turntable 2 coaxially with rotation axis A, a fluctuating intensity profile dependent on the positioning angle of substrate S with respect to rotation axis A will be recorded at receiving device 5.

One complete revolution results in an intensity profile that is a sinusoidal curve whose amplitude is characteristic of the positional deviation of substrate S with reference to rotation axis A. The intensity profile shows a distinct peak as notch K passes by. Based on said peak, on the amplitude difference and, for example, on the locations of the amplitude maxima and minima of the sinusoidal oscillation, the actual position of substrate S in terms of a coordinate system of turntable 2 can be determined by calculation. An improvement in the exact determination of the position of notch K is obtained by differentiating the measured intensity profile with an approximation curve that continues the basic sinusoidal oscillation in the region of the peak.

Once the exact position of notch K of substrate S being identified is known, it is then possible to calculate the actual position of identification marking I by means of a calculation device, for example a microcomputer, that is not depicted in the drawing.

For reading-out purposes, identification marking I of substrate S is rotated at least into the vicinity of sensing region E of a reading device 6. The radial positional deviation Δr of substrate S is then compensated for, if necessary, by means of an appropriate displacement of reading device 6. Reading device 6 is embodied here as an OCR reader with which letters, number, and other characters located in sensing region E of reading device 6 can be identified. As FIG. 1 shows, said sensing region E is very small compared to the surface area of substrate S. This makes it possible to evaluate the sensed image data very quickly.

Sensing region E is defined by means of an illuminator 7 with a stop, which is arranged in front of reading device 6 (in this case a camera 8 having a lens 9).

In order to move reading device 6 toward and away from substrate S, a carriage 10 that is mounted so as to slide substantially radially with respect to rotation axis A is provided. A guide rail 12, on which carriage 10 is guided linearly, is provided for this purpose on a baseplate 11. Also provided on baseplate 11 in addition to guide rail 12 is a drive device for carriage 10 which, for example, comprises a cord drive. A drive motor 13 that drives a cord pulley 14 is flange-mounted for that purpose on baseplate 11. The associated cord 15 reverses around a reversing pulley 16 that is also mounted on baseplate 11. In addition, carriage 10 is coupled to cord 15. Other drive systems can also be used instead of the cord drive.

Carriage 10 comprises a vertical column 17. Reading device 6 is attached on this, by way of a rotationally adjustable holding arm 18, in such a way that its sensing region E falls onto a substrate located on turntable 2. Furthermore, illumination device 4 and receiving device 5 are also correspondingly attached to column 17 of carriage 10. In order to measure the light intensity, illumination device 4 and receiving device 5 are arranged opposite one another with respect to a substrate S, so that light beam L of illumination device 4 is partially interrupted by the edge of substrate S.

This combined arrangement of illumination device 4, receiving device 5, and carriage 10 makes possible easy adaptation of identification arrangement 1 to substrates S having different diameters. In principle, identification arrangement 1 depicted here can be used to identify substrates S of different diameters in immediate succession. Illumination device 4 and receiving device 5 can also be used for adjustment to the respective diameter, by displacing them inward (i.e. toward substrate S) from a position maximally distant from rotation axis A until a change in light intensity is observed at receiving device 5.

Figure 3:
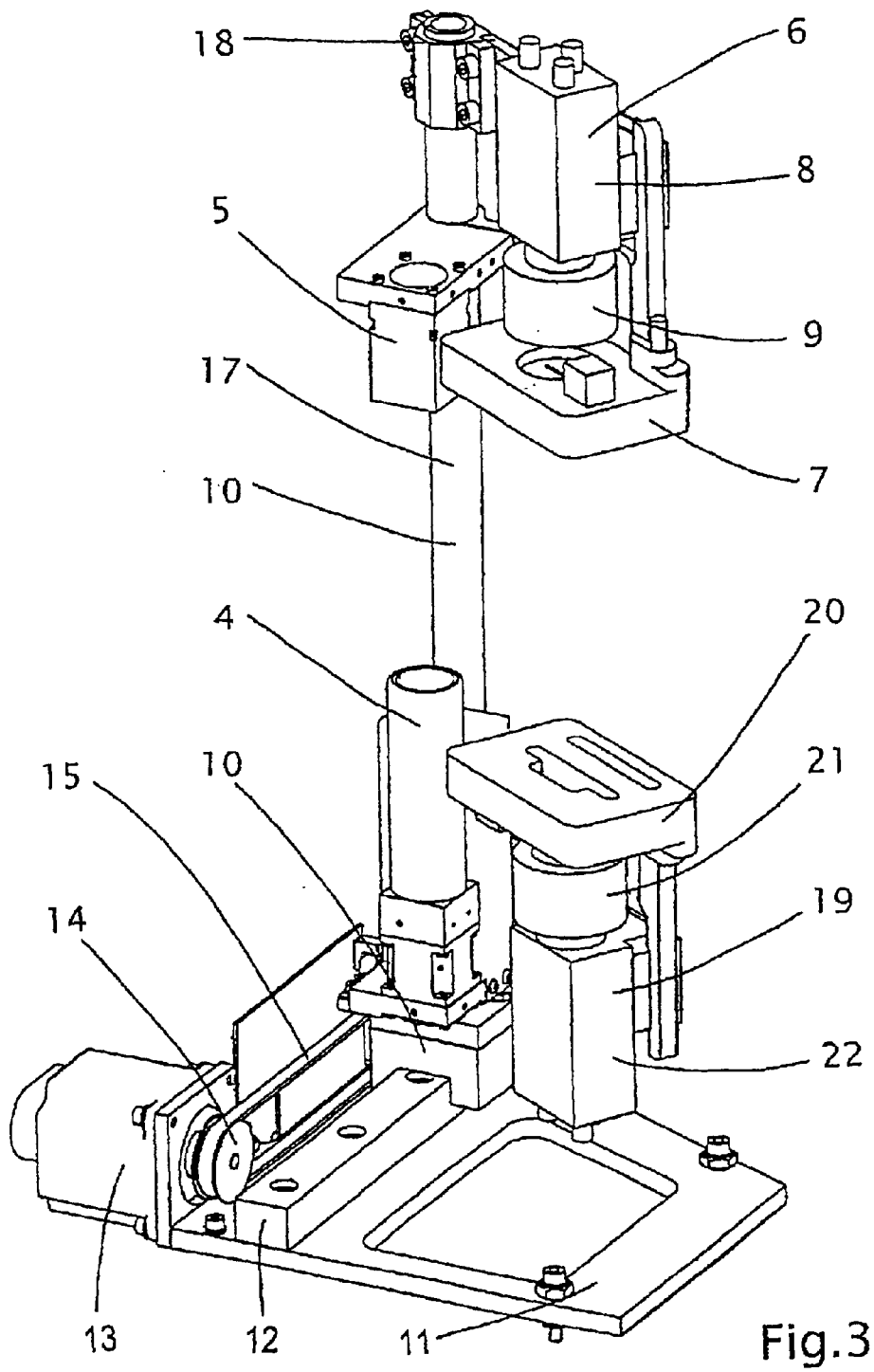
FIG. 3 is a view, corresponding to FIG. 2, of a second exemplary embodiment of a substrate identification arrangement.

A second exemplary embodiment is depicted in FIG. 3. This corresponds substantially to the first exemplary embodiment, so that only the differences will be described at this juncture. Identical components are labeled with the same reference characters in both exemplary embodiments.

In the module made up of baseplate 11 and carriage 12 depicted in FIG. 3, in contrast to the first exemplary embodiment, a second reading device 19, with which an identification marking on a second side of substrate S can be read, is provided. The configuration of second reading device 19 corresponds to that of first reading device 6, and it too comprises an illuminator 20, an objective 21, and a camera 22 for sensing OCR-readable information. In the second exemplary embodiment, the two reading devices 6 and 19 are arranged opposite one another with respect to a substrate S placed on turntable 2. It is thereby possible to read out identification markings on both sides of a substrate S without having to turn it over.

The mode of operation for identifying a substrate S will now be briefly explained below, referring to the first exemplary embodiment.

For the identification of a substrate S, the latter is first placed on turntable 2 with its center axis M roughly centered with respect to rotation axis A. Exact alignment of axes A and M is not necessary, however. The position of notch K also is of no importance.

Carriage 10 is then displaced until the edge of substrate S projects into light beam L of illumination source 4. If substrates S being examined are always of the same diameter, this adjustment is performed once.

Turntable 2 is then caused to rotate. During the rotation, the light intensity as a function of the positioning angle of turntable 2 is measured at receiving device 5. From the intensity profile obtained for one revolution, the actual position of substrate S on turntable 2 can then be determined exactly. For example, the positional deviation can be ascertained from the amplitude fluctuation of the measured basic oscillation of the intensity profile. In addition, the position of center point M of substrate S with respect to the local coordinate system of turntable 2 can be calculated from the phase angle with respect to a reference system of turntable 2. An angular deviation of substrate S with respect to a target position on turntable 2 is calculated using the intensity peak caused by notch K.

Since the location of an identification marking I with respect to the location of notch K on substrate S is known, with the information now known it is possible to calculate the actual position of identification marking I and bring it into coincidence with sensing region E of first reading device 6 or of a second reading device 19 that is optionally present. Any angular deviation is compensated for by a rotation of turntable 2 about axis A.

The deviation resulting from the positional deviation Δr, on the other hand, is compensated for by a displacement of sensing region E, for which purpose carriage 10 is moved accordingly. The angular correction is preferably accomplished simultaneously with the translational correction by means of carriage 10. This procedure has the advantage that even very small identification markings I can be rapidly located with no need for a relative motion between the substrate and turntable 2.

In addition, because identification marking I is arrived at precisely, sensing region E can be made very small; the result of this, in turn, is that the calculation effort for evaluation of the data read in sensing region E remains low. The overall result is to bring about a very high identification speed.

Parts List

1 Identification arrangement
2 Turntable
3 Drive device
4 Illumination device
5 Receiving device
6 Reading device
7 Illuminator
8 Camera
9 Objective
10 Carriage
11 Baseplate
12 Guide rail
13 Drive motor
14 Cord pulley
15 Cord
16 Reversing pulley
17 Column
18 Holding arm
19 Second reading device
20 Illuminator
21 Objective
22 Camera
A Rotation axis
E Sensing region of reading device
I Identification marking
K Notch
L Light beam
M Center axis of substrate
S Substrate
Δr Positional deviation

What is claimed is:

1. An arrangement for the identification of a substrate, in particular a semiconductor wafer, having at least one identification marking that is located in a predefined position with respect to a position mark on the edge zone of the substrate, comprising a turntable for rotating a substrate placed thereon about a rotation axis;

an illumination source and a receiving device for evaluating the intensity of the light emerging from the illumination source, the illumination source and receiving device being arranged in such a way that the edge zone of the substrate, upon rotation thereof, influences the light intensity striking the receiving device;

a device for reading the identification marking, having a sensing region that senses only a subregion of the substrate placed on the turntable, the position of the sensing region relative to the rotation axis being modifiable; and a calculation device that calculates, from the intensity changes ascertained during the rotation, a manipulated variable for a correction rotation angle about the rotation axis for alignment of the identification marking with respect to the sensing region, and a manipulated variable for a correction motion for changing the position of the sensing region with respect to the rotation axis or with respect to the actual position of the identification marking, and outputs them to a positioning device.

2. The arrangement as defined in claim 1, wherein the reading device is movable toward and away from the rotation axis as a function of the actual position of the identification marking.

3. The arrangement as defined in claim 2, wherein the reading device is arranged on a carriage having a linear guidance system.

4. The arrangement as defined in claim 1, wherein the identification marking contains an OCR-readable code, and the reading device is designed to recognize such codes.

5. The arrangement as defined in claim 1, wherein the reading device is configured to read multiple identification markings applied onto sides of the substrate opposite one another.

6. The arrangement as defined in claim 1, wherein the illumination source and the receiving device are arranged opposite one another in such a way that upon rotation of the turntable, the edge zone of a substrate placed on the turntable projects into the light beam directed onto the receiving device.

7. The arrangement as defined in claim 6, wherein the illumination device and the receiving device are together movable toward and away from the turntable.

8. The arrangement as defined in claim 6, wherein the receiving device and the illumination device are provided, together with the reading device, on the carriage.

9. A method for the identification of a substrate, in particular a semiconductor wafer, having at least one identification marking that is located in a predefined position with respect to a position mark on the edge zone of the substrate, the method comprising:

rotating the substrate about a rotation axis;

evaluating a change in light intensity influenced, during the rotation of the substrate, by its edge zone in correlation with the position of the position mark;

determining the actual position of the identification marking from the profile of the change in intensity:

calculating from it a manipulated variable for a correction rotation angle about the rotation axis for alignment of the identification marking with respect to the sensing region, and a manipulated variable for a correction motion for changing the position of the sensing region with respect to the rotation axis or with respect to the actual position of the identification marking;

performing the alignment of the sensing region relative to the actual position of the identification marking on the basis of said manipulated variables and reading out the information of the identification marking for further processing.

10. The method as defined in claim 9, wherein as a function of the actual position of the identification marking, a correction motion for the sensing region with respect to the rotation axis toward or away from the latter is calculated and caused.

11. The method as defined in claim 9, wherein the identification marking contains an OCR-readable code.

12. The method as defined in claim 9, wherein the rotation through the correction rotation angle for alignment of the identification marking with reference to the sensing region, and the correction motion for modifying the position of the sensing region with respect to the rotation axis or with respect to the actual position of the identification marking, are accomplished simultaneously.

13. The method as defined in claim 9, wherein the correction motion is performed as a straight-line motion.

* * * * *